United States Patent
Dubinsky et al.

(10) Patent No.: US 11,942,093 B2
(45) Date of Patent: Mar. 26, 2024

(54) SYSTEM AND METHOD FOR SIMULTANEOUS MULTILINGUAL DUBBING OF VIDEO-AUDIO PROGRAMS

(71) Applicant: SYNCWORDS LLC, Long Island City, NY (US)

(72) Inventors: Aleksandr Dubinsky, Long Island City, NY (US); Taras Sereda, Irpin (UA)

(73) Assignee: SYNCWORDS LLC, Long Island City, NY (US)

( * ) Notice: Subject to any disclaimer, the term of this patent is extended or adjusted under 35 U.S.C. 154(b) by 0 days.

(21) Appl. No.: 16/810,588

(22) Filed: Mar. 5, 2020

(65) Prior Publication Data

US 2020/0211565 A1  Jul. 2, 2020

Related U.S. Application Data

(60) Provisional application No. 62/814,419, filed on Mar. 6, 2019.

(51) Int. Cl.
| | | |
|---|---|---|
| G10L 17/00 | (2013.01) | |
| G10L 13/00 | (2006.01) | |
| G10L 13/08 | (2013.01) | |
| G10L 25/57 | (2013.01) | |
| G10L 25/63 | (2013.01) | |

(52) U.S. Cl.
CPC .............. *G10L 17/00* (2013.01); *G10L 13/00* (2013.01); *G10L 13/08* (2013.01); *G10L 25/57* (2013.01); *G10L 25/63* (2013.01)

(58) Field of Classification Search
CPC ......... G10L 13/00; G10L 13/08; G10L 17/00; G10L 25/57; G10L 25/63
USPC ......................................................... 704/235
See application file for complete search history.

(56) References Cited

U.S. PATENT DOCUMENTS

| | | | |
|---|---|---|---|
| 2008/0195386 A1* | 8/2008 | Proidl | G10L 13/033 704/235 |
| 2009/0037179 A1* | 2/2009 | Liu | G10L 13/08 704/260 |
| 2011/0064388 A1* | 3/2011 | Brown | H04N 21/234318 386/285 |
| 2016/0021334 A1* | 1/2016 | Rossano | G10L 13/033 704/2 |
| 2020/0058289 A1* | 2/2020 | Gabryjelski | G10L 17/00 |
| 2020/0342852 A1* | 10/2020 | Kim | G06N 3/0454 |
| 2020/0404386 A1* | 12/2020 | McCartney, Jr. | H04N 21/235 |

* cited by examiner

*Primary Examiner* — Pierre Louis Desir
*Assistant Examiner* — Nicole A K Schmieder
(74) *Attorney, Agent, or Firm* — Nath, Goldberg & Meyer; Jerald L. Meyer; Morgan D. Rosenberg

(57) ABSTRACT

A system and method to perform dubbing automatically for multiple languages at the same time using speech-to-text transcriptions, language translation, and artificial intelligence engines to perform the actual dubbing in the voice likeness of the original speaker.

12 Claims, 2 Drawing Sheets

WORD & PHRASE PARAMETERS

SPEAKER IDENTIFICATION
GENDER AND AGE
INFLECTION AND EMPHASIS
RELATIVE VOLUME
TONALITY
RASPNESS
EMOTIONAL INDICATOR

SYSTEM AND METHOD FOR SIMULTANEOUS MULTILINGUAL DUBBING OF VIDEO-AUDIO PROGRAMS

CROSS REFERENCE TO RELATED APPLICATIONS

This Present Application is the non-provisional counterpart of U.S. Provisional Patent Application Ser. No. 62/814,419 filed on Mar. 6, 2019. This Present Application claims the benefit and priority of said Provisional Patent Application, which is incorporated by reference in its entirety herein.

BACKGROUND OF THE INVENTION

Dubbing of videos with dialog in a language different from that of the active speakers is difficult and cumbersome. It is often done by human voice-over in order to synchronize the translated speech patterns to the speaker's lip movements and to closely reproduce the speaker's original intonation and emphasis. Good voice actors are expensive, and Oscar-winning voice actors simply do not exist.

Each dubbing exercise for a particular language is a separate activity. Dubbing of a video in Spanish is different and separate from dubbing of the same video in French. Moreover, close captioned subtitles are required in addition to the voice-over. For example, an English video for the Chinese market requires dubbing into Mandarin. However, Mandarin is only one of several Chinese languages. Nevertheless, although the Chinese spoken languages are different, they are written identically. Thus, a Cantonese and Mandarin speaker can read and understand the same written text. To that end, almost all Chinese videos have Chinese subtitles.

Thus, there is a need for a system and method for automatically performing multilingual dubbing of videos. This would make such dubbing far less expensive. It would replace humans for all but the highest budget dubbing projects.

SUMMARY OF THE INVENTION

The Present Invention is for a system and method to perform dubbing automatically for multiple languages at the same time using speech-to-text transcriptions, language translation, and artificial intelligence engines to perform the actual dubbing in the voice likeness of the original speaker. While speech-to-text, machine language translation, and text-to-speech conversion hardware and software are state-of-art, their combination to produce the Present Invention is novel and unique.

DETAILED DESCRIPTION OF THE INVENTION

Figure 1:
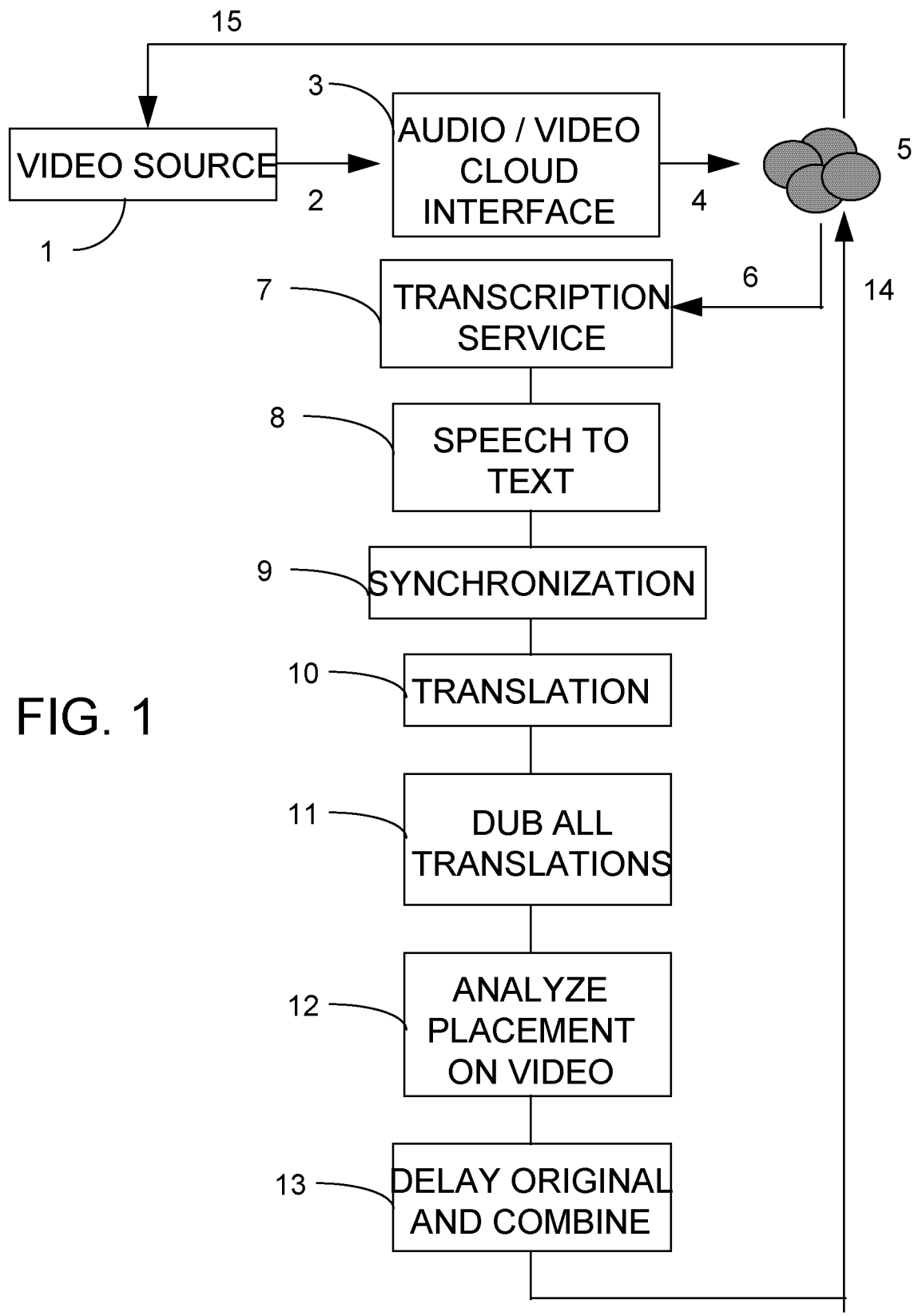
FIG. 1 is a schematic representation of the process steps for producing a dubbing project.

There are two primary embodiments of the Present Invention. One embodiment produces the dubbed video as a real time audio/video stream, and the other embodiment creates the finished product offline. Referring to FIG. 1, in an exemplary embodiment, a video program containing both audio and video is transmitted from a video source 1 via element 2 to a device 3 that processes the program and transmits it via element 4 to a cloud network 5. As referred to herein, the video program is a series of video frames containing an audio track. Device 3 is a cloud interface capable of receiving the unprocessed video from source 1 or transmitting the finished video back to source 1. For example without limitation, the video source 1 may be a broadcast station or a web streaming service. In another embodiment, cloud processing could be eliminated. A local area network, wide area network, or the Internet would be a reasonable substitution. Further, there could be a direct connection via element 6 from element 2 to transcription service 7, which is on a separate computer.

In all embodiments, the system of the Present Invention transmits the video program via element 6 to transcription service 7, which produces a text script of the audio program in the originally recorded language using a speech-to-text engine 8. A computerized or human transcription may be used. Text-to-speech software recognizes phonemes, and it uses a dictionary to form words. The computerized engine 8 uses artificial intelligence to distinguish between various speakers and to assign the text strings to those speakers. Further, the system also transcribes and synchronizes inflection, emphasis, and volume variations to the text. The system is capable of distinguishing between male and female speakers (including children), and it assigns these identification parameters to the text. The identification parameters could include a "raspness" index to add character to the voice. A synchronizer 9 automatically attaches timing parameters to each word in the text string. These timing parameters measure the temporal length of each word and synchronize the inflection, emphasis, and volume indicators with various temporal points within each string.

Figures 2A, 2B:
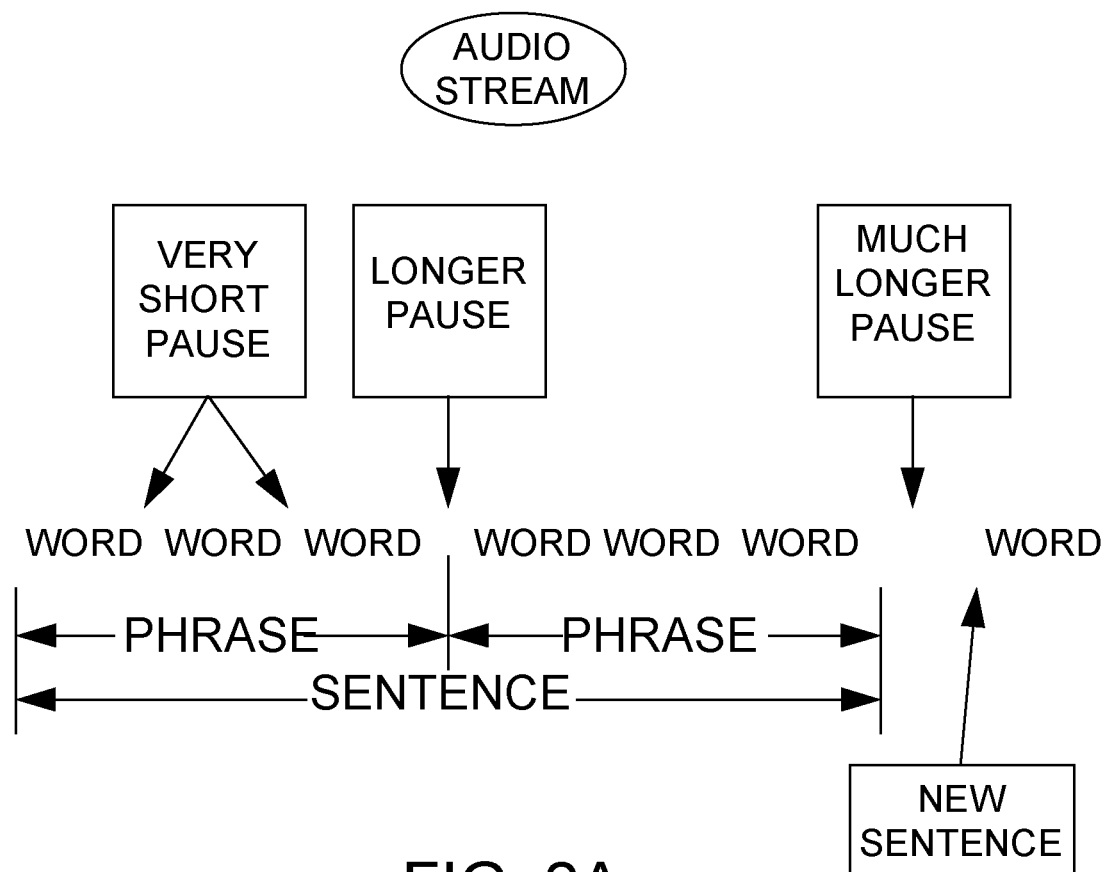
FIG. 2A illustrates how the speech-to-text component of the Present Invention distinguishes between words, phrases, and sentences based upon pauses between words.
FIG. 2B describes parameters associated with each word, phrase, and sentence that is collected and stored when automatically analyzing a source audio stream.

The timing parameters establish the start time and the end time for each word. In this way, the transcription algorithm can measure the temporal length of pauses in speech. FIG. 2A illustrates how timing of pauses is used to analyze the text. The shortest pauses are between words continuously strung into a phrase. There are longer pauses between phrases, and even longer pauses between sentences. Very long pauses indicate that there is no speech to transcribe. Thus, an audio stream may be transcribed into words that are grouped in phrases and sentences. Sentences consist of one or more phrases. The parameters to be collected are shown in FIG. 2B. In any phrase, emphasis will invariably be on its last word. That word will have greater intensity of volume. This is important when it comes to language translation. Within a given phrase, there will be some words having greater relative volume than the other words, and the last word having greater relative volume than the others. Emphasis is established using relative volume.

Any given phrase will be spoken by the same person. Thus the parameters of gender and age will be constant within the phrase. With rare exceptions, this will also apply to sentences.

An artificial intelligence component of the software determines the emotional aspect of each phrase or sentence. This is determined by the way words are uttered in sequence. People often sing when they speak. Software can detect when a person is whining by the tonality of words, their location in a phrase or sentence, and how fast the words are uttered relative to each other. The software is able to detect when speakers are happy, sad, frightened, etc. FIG. 2B shows many of the parameters associated with words and phrases.

The text strings are simultaneously translated phrase by phrase into multiple languages by translation engine 10. The system then produces multiple scripts each comprising a series of concatenated text strings representing phrases along with associated inflection, emphasis, volume, and emotional indicators as well as timing and speaker identifiers that are derived from the original audio signal. Each text string in both the untranslated and translated versions has a series of timing points. The system synchronizes these timing points of the words and phrases of the translated strings to those of the untranslated strings. It is important that the translated string retains the emotional character of the original source. Thus, intonations of certain words and phrases in both the translated and source text strings is retained along with volume, emphasis, and relative pause lengths within the strings.

Within a phrase, the number and order of words might be different for different languages. This is based on grammar discrepancies in different languages. For example, in German, verbs normally appear at the end of a phrase, as opposed to English where subjects and verbs maintain close proximity. Single words could translate to multiple words and vice versa. For example, in many languages, a potato is an earth apple. In French, this translation has the same number of syllables, but in other languages, there could be more or less syllables. That is why it is difficult to translate songs from language to another while keeping the same melody. In any event, the beginning and end temporal points for each phrase must be the same in the original source text and the translated target text. Thus, when translated voice dubbing occurs, speech cadence in the dubbed translation may be sped up or slowed down so that temporal beginning and end points of any phrase would be the same in any language.

Voice dubbings are created from the text strings using a text-to-speech module. All of the parameters contained in the text strings associated with each word, phrase, and sentence are used to create the audio stream. Thus, speech made by a person in the target language will sound exactly like the speech made by the same person in the source language. All of the voice and emotional characteristics will be retained for each person in each phrase. It will appear as if the same speaker is talking in a different language.

Multiple language dubbings are simultaneously produced for all translated scripts using dubbing engine 11. Here, text-to-speech synthesizers are used to create audio strings in various languages, corresponding to phrases, that are time synchronized to their original language audio strings. Corresponding translated words are given the same relative volume and emphasis indicators as their source counterparts. Each audio string has multiple temporal points that correspond to those in their respective text strings. In this way, the translated language strings fully correspond in time to the original language strings. Various speakers are assigned individual voiceprints based on sex, age and other factors. The intonation, emphasis, and volume indicators ensure that the voice dubbings sound realistic and as close to the original speaker's voice as possible.

Close captioning (CC) is another factor to consider. Where this is desired, the translated text is either flashed or scrolled onto the screen as subtitles. The system has the ability to determine the placement of the subtitles on the screen so as not to interfere with the focus of the video program content.

An Analysis Module 12 analyzes the placement and superposition of the subtitles onto the original video program. Once this has been done (using artificial intelligence), the dubbed video is sent back to the cloud via element 14, and then back to video source 1 via element 15.

The real time embodiment requires an extra step, i.e., Step 13, where transmission of the video program back to video source 1 is delayed to allow synchronization of the dubbed audio to the video. The delay is very short, being a fraction of a minute.

The offline or non-real time embodiment functions similarly to the real time embodiment except that more humans may be added into the loop to effect cleanup and quality control. The primary difference is that the offline embodiment provides more accuracy due to human intervention. The following represents some of the workflow differences that may occur with the offline embodiment.

1. Humans may transcribe the audio rather than relying on a machine transcription.
2. The transcription may better be synchronized with the speech.
3. There is more opportunity for quality control.
4. Human language translation is often more accurate and localized than machine language translation.
5. A graphical user interface (GUI) interface may be used to edit the synthetic dubbed audio for the following features:
   a. audio volume—loudness or softness;
   b. compression of the words to comply with the rate of speech; and
   c. intonation—emphasis of the words and voice can be adjusted to be the same as in the originally recorded speech.

Other cleanup tools would allow:
  editing speech-to-text;
  editing timing;
  editing diarization; and
  editing the prosody/intonation, voice, and other aspects of generated speech.

We claim:

1. A system that performs dubbing automatically for multiple languages simultaneously using speech-to-text transcriptions and language translation comprising:
   a. a first device that captures an original video program further comprising video image frames and synchronized audio speech by one or more speakers recorded in a source language;
   b. a first transmitter that transmits the original video program;
   c. a second device that processes the original video program and transmits it to a transcription service that
      i. converts the synchronized audio speech to text strings, wherein each text string further comprises a plurality of words;
      ii. determines the temporal start and end points for each of the plurality of words;
      iii. from the temporal start and end points for each of the plurality of words, determines timing of pauses between each of the plurality of words;
      iv. from the timing of the pauses, determines which words in each text string form phrases and which words in each text string form sentences;
      v. assigns temporal anchors to each phrase and sentence;
      vi. assigns parameters to each word, phrase and sentence, wherein said parameters determine:
        a speaker identifier;

a gender of the speaker;
whether the speaker is an adult or a child;
an inflection and emphasis of each word in the phrase;
a volume of each word in the phrase;
a tonality of each word in the phrase;
a raspness of each word in the phrase; and
an emotional indicator for the phrase,
wherein the speaker identifier and the emotional indicator are each determined using artificial intelligence;

vii. synchronizes the assigned parameters of each word, phrase and sentence using the temporal anchors within each text string;

d. a translation engine that produces a plurality of text scripts in various target languages from each phrase, wherein each of plurality of text scripts contains a series of concatenated text strings along with associated inflection, tonality, emphasis, raspness, emotional indication, and volume indicators as well as timing and speaker identifiers for each word, phrase, and sentence that is derived from the synchronized audio speech recorded in the source language;

e. a dubbing engine that creates audio strings in the various target languages that are time synchronized to their source language audio strings by utilizing the temporal anchors;

f. an analysis module that analyzes the optional placement and superposition of subtitles comprising the text strings in either the source language or the various target languages onto the original video program, wherein the analysis of the optional placement and the superposition of the subtitles is performed using artificial intelligence; and g. a second transmitter that transmits the original video program containing the created audio strings in the various target languages, and which may also optionally comprise the subtitles.

2. The system of claim 1 wherein the second device transmits the original video program to the transcription service via a computer cloud.

3. The system of claim 1 wherein the system has the capability to either scroll or flash the subtitles on a screen.

4. The system of claim 1 wherein transmission of the original video program containing the created audio strings is delayed.

5. The system of claim 1 wherein the transcription service is fully computerized.

6. A method for automatically dubbing a video program comprising video image frames and synchronized audio speech by one or more speakers recorded in a source language into a plurality of target languages simultaneously using speech-to-text transcriptions and language translation, said method comprising:

a. capturing the video program;
b. transmitting the video program to a transcription service;
c. converting the synchronized audio speech to text strings, wherein each text string further comprises a plurality of words;
d. determining the temporal start and end points for each of the plurality of words;
e. from the temporal start and end points for each of the plurality of words, determining the timing of pauses between each of the plurality of words;
f. from the temporal start and end points for each of the plurality of words, determining which words in each text string form phrases and which words in each text string form sentences;
g. assigning temporal anchors to each word, phrase and sentence;
h. assigning parameters to each word, phrase and sentence, wherein said parameters determine:
a speaker identifier;
a gender of the speaker;
whether the speaker is an adult or a child;
an inflection and emphasis of each word in the phrase;
a volume of each word in the phrase;
a tonality of each word in the phrase;
a raspness of each word in the phrase; and
an emotional indicator for the phrase,
wherein the speaker identifier and the emotional indicator are each determined using artificial intelligence;
i. synchronizing the assigned parameters of each word, phrase and sentence using the temporal anchors within each text string;
j. translating the text strings in the source language to produce a plurality of text scripts in the various target languages, wherein each of plurality of text scripts contains a series of concatenated text strings along with associated inflection, tonality, emphasis, raspness, emotional indication, and volume indicators as well as timing and speaker identifiers for each word, phrase, and sentence that is derived from the synchronized audio speech recorded in the source language;
k. from the translated text strings, dubbing translated audio strings in the various target languages that are time synchronized to their source language audio strings by utilizing the temporal anchors;
l. analyzing the placement and superposition of subtitles comprising the text strings onto the video program using artificial intelligence; and
m. transmitting the video program containing the translated audio strings and translated text strings for final processing.

7. The method of claim 6 wherein final processing further comprises live streaming the video program containing the translated audio strings and translated text strings.

8. The method of claim 6 wherein final processing further comprises recording the video program containing the translated audio strings and translated text strings for future transmissions.

9. The method of claim 6 wherein the video program is transmitted to the transcription service via a computer cloud.

10. The method of claim 6 further comprising either scrolling or flashing the subtitles on a screen.

11. The method of claim 6 wherein the transcription service is fully computerized.

12. The method of claim 6 wherein the transcription service comprises human beings transcribing the synchronized audio speech into the text strings in the source language.

* * * * *